United States Patent
Kumar

(10) Patent No.: US 7,131,119 B2
(45) Date of Patent: Oct. 31, 2006

(54) CODE OPTIMIZATION

(75) Inventor: Sinha Navin Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 09/870,087

(22) Filed: May 30, 2001

(65) Prior Publication Data
US 2003/0079209 A1  Apr. 24, 2003

(51) Int. Cl.
G06F 9/45 (2006.01)

(52) U.S. Cl. .............. 717/160; 717/150; 717/154

(58) Field of Classification Search ........ 717/150, 717/154, 160
See application file for complete search history.

(56) References Cited

U.S. PATENT DOCUMENTS

| | | | | |
|---|---|---|---|---|
| 5,361,354 A | * | 11/1994 | Greyzck | 717/160 |
| 5,797,013 A | * | 8/1998 | Mahadevan et al. | 717/160 |
| 5,812,855 A | | 9/1998 | Hiranandani et al. | |
| 5,857,105 A | * | 1/1999 | Ayers et al. | 717/144 |
| 5,862,384 A | * | 1/1999 | Hirai | 717/160 |
| 5,999,737 A | | 12/1999 | Srivastava | |
| 6,026,240 A | * | 2/2000 | Subramanian | 717/161 |
| 6,038,398 A | * | 3/2000 | Schooler | 717/160 |
| 6,292,940 B1 | * | 9/2001 | Sato | 717/157 |
| 6,301,706 B1 | * | 10/2001 | Maslennikov et al. | 717/160 |
| 6,539,541 B1 | * | 3/2003 | Geva | 717/150 |
| 6,748,589 B1 | * | 6/2004 | Johnson et al. | 717/150 |

OTHER PUBLICATIONS

Steve S. Muchnick, Advanced Compiler Design Implementation, Morgan Kaufmann, San Francisco, California 1997, Chapter 18.

* cited by examiner

*Primary Examiner*—Tuan Dam
*Assistant Examiner*—Michael Yigdall
(74) *Attorney, Agent, or Firm*—Anthony V. S. England; T. Raa Coca

(57) ABSTRACT

A code optimizing procedure involves isolating code from a loop construct, executed a predetermined number of times, and optimizing the code for execution conditions which cause the loop to be executed that number of times. This code is compared against corresponding code which has not be optimized, and it is determined whether the inclusion of this code is favorable. If the benefits of including this code are judged to be significant, the code is modified by inclusion of this optimized code, which is conditionally executed when the loop is encountered.

8 Claims, 3 Drawing Sheets

CODE OPTIMIZATION

FIELD OF THE INVENTION

The invention relates to code optimization and relates particularly to the optimization of code produced by high level computer programming languages involving loop constructs.

BACKGROUND OF THE INVENTION

High level programming languages are generally favoured over lower level languages for the ease with which they can be used to provide a well-defined structure to computer programs written using such languages. Although high level languages simplify programming tasks, as well as assisting program readability and maintenance, the compilation of programming instructions written in these languages can be cumbersome and less than optimal.

When using high level programming languages, the programmer must either be content with the code produced by the compiler of choice, or ensure that the compiler generates relative efficient code from the adopted programming style. The modern approach has been to design compilers to optimise the code produced irrespective of the programming style adopted by a programmer. This frees the programmer from considering implementation details of the code, allowing the programmer to focus more specifically on actual design issues.

Compiler design represents a significant field of endeavour, and many approaches to improving the computational efficiency of code produced by compilers have been proposed and adopted to date. However, this existing approach is not without limitations.

Accordingly, further improvements in generating code from high level programming languages would be of clear benefit.

SUMMARY OF THE INVENTION

Loop constructs are a particular source of inefficiency in code generated from high level programming languages, and the optimization of compiled code is advantageously improved by separately optimising loop code for loop repetitions, and implementing the resulting optimised code if such an implementation is deemed favourable.

Accordingly, the invention provides a method of optimizing the compiled code generated from high level computer programming languages which include loop constructs, the method comprising steps of:

(1) providing a loop code segment corresponding with a loop construct written in a high level programming language, in which the loop construct is executed a loop repetition number of times n;

(2) providing execution conditions required to cause execution of the loop construct the loop repetition number of times n;

(3) optimizing the loop code segment for the execution conditions to provide a consolidated code segment corresponding with the execution conditions for execution of the loop said loop repetition number of times n;

(4) determining whether the consolidated code segment should be executed in preference to the corresponding code segments before said optimization; and (5) if said determination is favourable, including the consolidated code segment in optimized code for a program written in the high level programming language.

The invention further provides a method of optimizing the compiled code generated from high level computer programming languages which include loop constructs, the method comprising steps of:

(1) providing a loop code segment corresponding with a loop construct written in a high level programming language, in which the loop construct is executed a loop repetition number of times n;

(2) providing a pre-loop code segment corresponding with programming instructions preceding the loop construct, and a post-loop code segment corresponding with instructions succeeding the loop construct;

(3) providing execution conditions required to cause execution of the loop construct the loop repetition number of times n;

(4) revising the pre-loop, loop and post-loop code segments to include the execution conditions; and (5) optimizing the pre-loop, loop and post-loop code segments for the execution conditions to provide a consolidated code segment corresponding with the execution conditions for execution of the loop said loop repetition number of times n;

(6) determining whether the consolidated code segment should be executed in preference to the corresponding code segments before said optimization; and (7) if said determination is favourable, including the consolidated code segment in optimized code for a program written in the high level programming language.

In a preferred form, the steps of the above described inventive methods are successively repeated a predetermined number of times k, in which the loop repetition number n successively takes values from 0 to k−1.

In preferred embodiments of the invention, the determination of whether the consolidated code segment should be included involves a cost-benefit analysis to determine whether the cost of using the consolidated code segment is reduced by a predetermined threshold compared with not using the consolidated code segment.

The invention also provides compilers for performing the inventive methods described above.

DETAILED DESCRIPTION OF EMBODIMENTS AND BEST MODE

Figure 1:
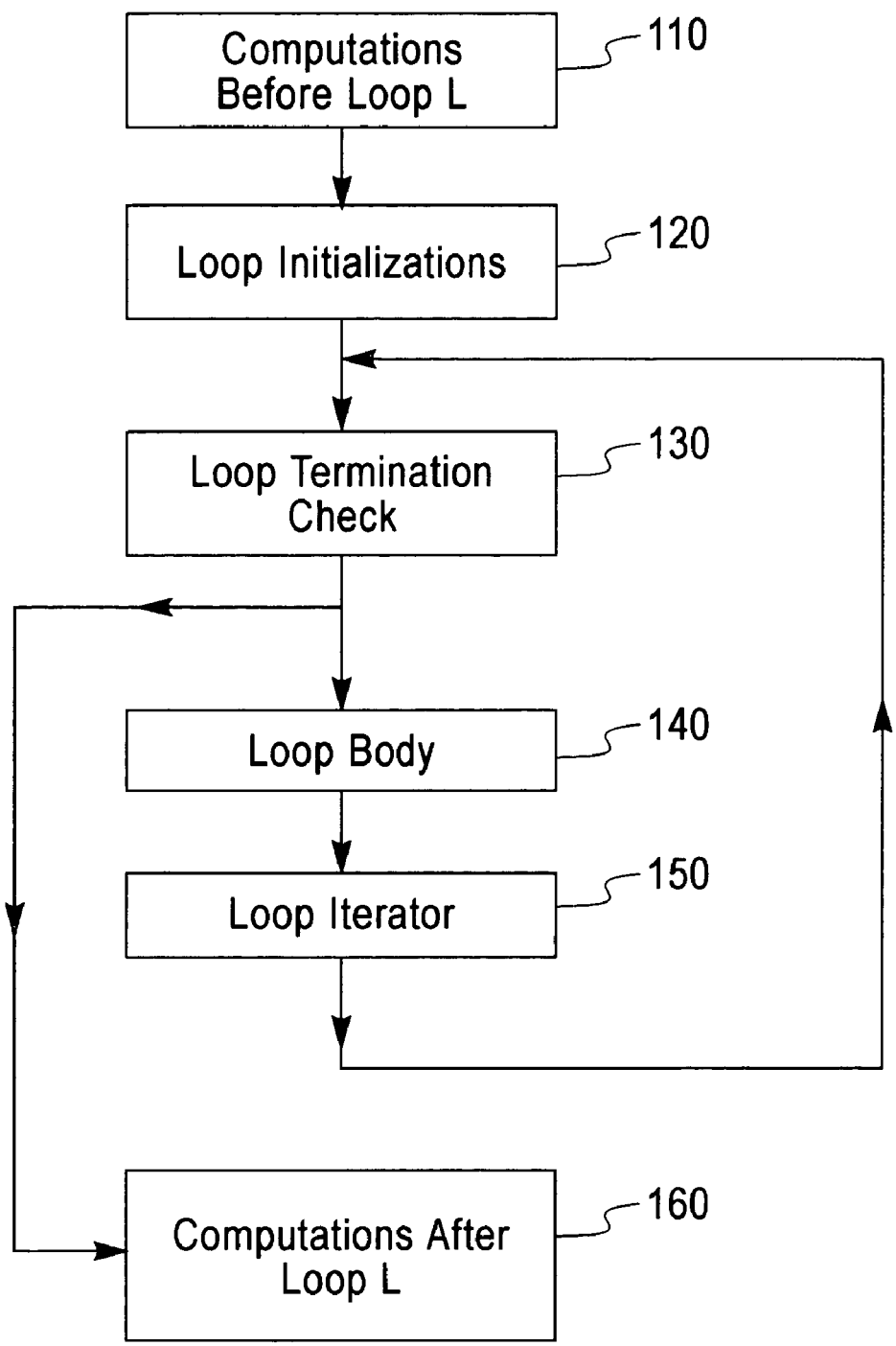
FIG. 1 is a flowchart illustrating the general structure of loop constructs in high level programming languages.

An embodiment of the invention is described in relation to the operation of a compiler for a high level computer programming language which uses loop constructs. This includes nearly all, if not all, of the high level programming languages. The described embodiment is illustrated with reference to an example given in the C programming language.

Loops are written in a generalized manner, so that (at least by default) the same piece of code is supposed to execute for all the cases when the loop executes. When the loop executes only a small number of times (for example, 0, 1 or 2 times) very little work is performed within the loop. Also, if this effect is propagated outside the loop, it would be found that in such cases, very little work needs to be done before and after the loop, as well. However, the usual data-flow analysis is unable to uncover such specialised optimizations, because the φ-functions used in these analyses tend to summarize the effect of the entire loop, whereby the information on what happens when the loop executes a relatively few number of times is lost.

The procedure outlined directly below, which implements the quicksort algorithm, is used to illustrate an embodiment of the invention.

```
#define SWAP(x,y) {int temp=x; x=y; y=temp;}
void quick sort (int A[ ], int low, int high)
{
    if (low<high)
    {
        int I,p,lastsmall;
        p=A[low];
        lastsmall=low;
        for(I=low+1; I<high; I++)
        {
            if (A[I]<p)
            {
                lastsmall++;
                SWAP(A[I], A[lastsmall]);
            }
        }
        SWAP(A[low], A[lastsmall]);
        quicksort(A, low, lastsmall);
        quicksort(A, lastsmall+1, high);
    }
}
```

In this example above, the "for" loop is written in a general manner and is, of course, quite readable. However, this code can result in the execution of several unnecessary instructions. For example, when low+1==high, the "for" loop doesn't execute at all, and at the end of the loop, the value of lastsmall is the same as before, that is, lastsmall==low. Thus, while the SWAP operation swaps A[low] with A[low], which is a wasteful operation, existing compiler technology would not remove this redundant operation. Similarly, the two recursive calls do not in this instance perform any task, since in both cases the second and the third actual arguments are equal in value.

Even the operations performed by the first two statements (namely p=A[low] and lastsmall=low) are just preparations for further computations, and do not have any significance on their own. Thus, when the condition low+1==high is true, there is no useful computation performed by the procedure, but nevertheless several unnecessary operations are executed.

The above code can be transformed as:

```
int quicksort(in A[ ], int low, int high)
{
    if(low+1<high)
    {
        int I,p,lastsmall;
        p=A[low];
        lastsmall=low;
        for(I=low+1; I<high; I++)
        {
            if(A[I]<p)
            {
                lastsmall++;
                SWAP(A[I], A[lastsmall]);
            }
```

-continued

```
        }
        SWAP(A[low], A[lastsmall]);
        quicksort(A, low, lastsmall);
        quicksort(A, lastsmall+1, high);
    }
}
```

Similarly, when the for loop executes once (that is, when low+2==high), if the conditional branch A[I]<p is not executed, the situation is the same as the one described in the previous example, because at the end of the loop, still low==lastsmall. When the conditional branch is taken, the first SWAP operation is redundant, because, it swaps A[low+1] with A[low+1], and both the recursive calls are redundant. Thus, the above code can be further modified as:

```
int quicksort(in A[ ], int low, int high)
{
    if(low+2==high)
    {
        if(A[low+1]<A[low])
        {
            SWAP(A[low], A[low+1];
        }
    }
    else if (low+2<high)
    {
        int I,p,lastsmall;
        p=A[low];
        lastsmall=low;
        for(I=low+1; I<high; I++)
        {
            if(A[I]<p)
            {
                lastsmall++;
                SWAP(A[i], A[lastsmall]);
            }
        }
        SWAP(A[low], A[lastsmall]);
        quicksort(A, low, lastsmall);
        quicksort(A, lastsmall+1, high);
    }
}
```

The described technique is capable of making such appropriate optimizations. This technique isolates the special cases of a loop executing 0, 1, 2 . . . k−1 times (where k is a constant configured in the compiler) and analyses the effect of such cases on the code preceding and following the loop body.

If any of these special cases are found to result in significant optimization, the modified, optimised code is branched out as a separate piece of code (as demonstrated in the above examples).

A general structure for loops is provided in FIG. 1. The techniques described herein are equally applicable to loops written using other structures (for example, do—while, repeat—until, etc.). The initial task is to isolate various components of a loop structure for performing the processing in the loop body, in step 140.

In a loop structure of any kind, three types of statements are necessarily present:
1. Loop Initializations in step 120
2. Loop Termination Check in step 130
3. Loop Iterators in step 150

The computations before the loop in step 110 are referred to as PRE_L and the computations performed after the loop in step 160 are referred to as POST_L.

Figure 2:
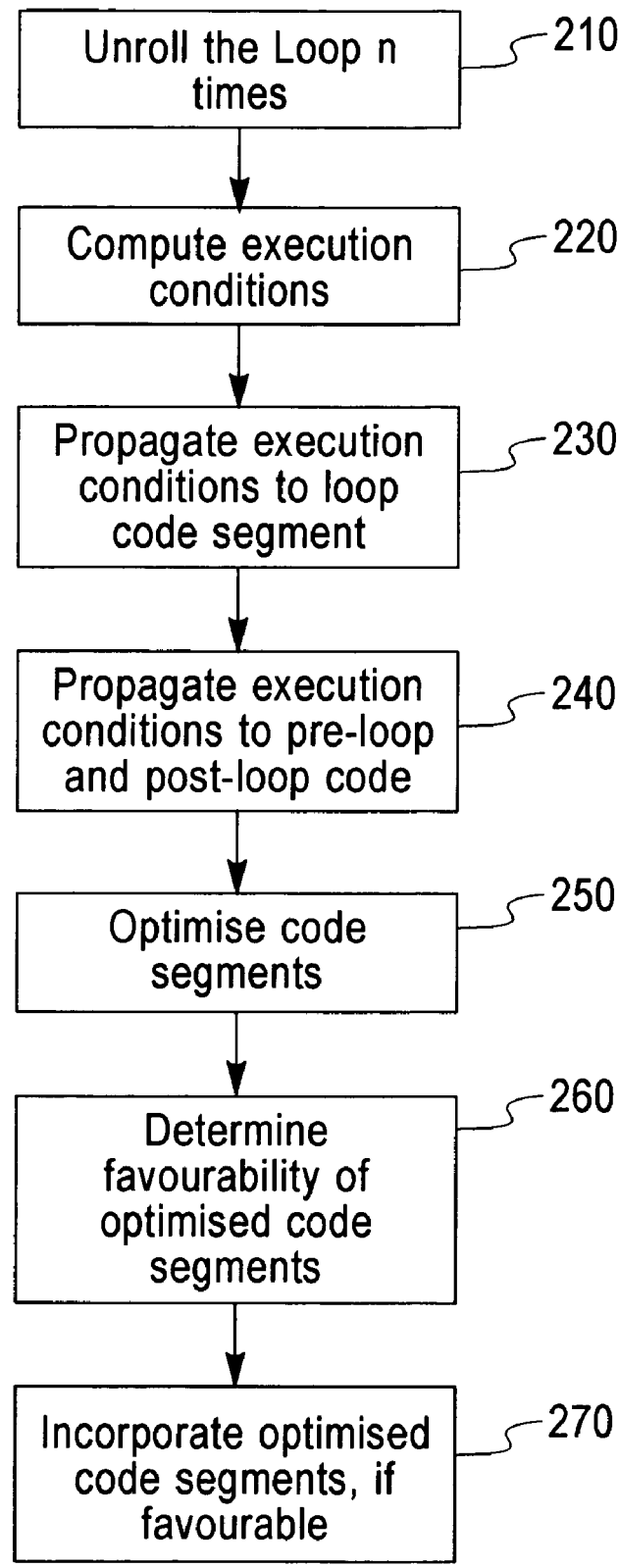
FIG. 2 is a flowchart illustrating steps which occur in optimising code in accordance with an embodiment of the invention.

FIG. 2 describes the steps involved in optimizing code. In the C programming language, the for—construct is structured as follows:

```
for    (Loop_Initializations;    Loop_Termination_Check;
Loop_Interators)
{
    LoopBody;
}
```

By contrast, the general structure of while loops is as follows:

```
Loop_Initialization;
While (Loop_Termination_Check)        /*while the terminating
conditions are not true */
{
    LoopBody;
    Loop_Iterators;
}
```

Let Current_Iterators be the set of all variables that affect the termination condition check. Assume that the loop body needs to be optimized for 0, 1, 2, . . . k–1 executions of the loop, where k is a pre-defined value.

Initialize the values of the variables in the set Current_Iterators to values that are assigned to those variables in the Loop_Initializations section.

For I=0 to k–1 iterations, do:
1. Unroll the loop "I" times, in step 210 (for the case I==0, this creates an empty loop body). Let us call this unrolled version L_I;
2. Compute the conditions under which the loop would execute "I" times, in step 220. This is obtained by equating the values of the variables in Current_Iterators to their respective values corresponding Loop_Termination_Checks and perform symbolic simplifications. Let these conditions be called EC_I (execution condition for I iterations)
3. Propagate the conditions EC_I into the unrolled loop body in step 230 and perform any optimizations, if possible, in step 250.
4. Propagate the conditions EC_I and any new conditions derived in the step 3 to POST_L in step 240 and perform any optimizations if possible in step 250; let the optimized POST_L be called POST_L_I;
5. Propagate the conditions EC_I and any new conditions derived in the step 3 to PRE_L in step 240 and perform any optimizations if possible in step 250; let the optimized PRE_L be called PRE_L_I.
6. Form a new code body:

```
If (EC_I)
{
    PRE_L_I;
    L_I;
    POST_L_I;
}
```

7. Perform a cost-benefit analysis in step 260 to determine whether there is any significant optimization to be gained by performing the steps noted under notes 1 to 6 above. This cost-benefit analysis determines whether a given optimization can be favourably applied in a particular case. In such an analysis, each operation is assigned a cost value based on the complexity of the operation (for example, the number of CPU cycles that it would normally take). The total cost of a code segment can be computed by summing up the operations of all the individual operations in that code segment.

The benefit of an optimization is estimated by comparing the cost of the code-fragment before and after the optimizations. Since each optimization may also include some overheads (for example, increase in code-size, etc.), an "optimization" is implemented only if it is assured that the gain achieved through it will definitely offset any such overheads. Thus, a compiler can be instructed (by configuration options set within the compiler, for example), to implement an optimization in a given context only if the optimization results in the desired gain. In such a scheme, "Overheads" may be assigned a particular predetermined cost value, or calculated as required.

8. If the optimization gained as computed in accordance with the step 260 is favourable, this newly created code is added as one of the branches out of the loop L in step 270. The variables in Current_Iterators are updated by applying the Loop_Iteration operations. The next iteration of this optimization is then performed. If the optimization gained here is not considered favourable, the process is stopped at this point.

Performing the steps noted in notes 1 to 8 to the quicksort procedure previously described as an example, the following procedure is obtained as now described.

The set Current_Iterator for this example contains the local variable I of the quicksort procedure.

The loop initialization statement initializes I to the expression low+1.

Thus, the value of the variable I in the Current_Iterator is set to (low+1).

Current_Iterator: (I=low+1);

This just implies that the variable used to take account of the iterations is I, and its initial value is low+1.

Working through the first iteration of our algorithm:
1. The loop body is unrolled 0 times. This produces an empty loop body.
2. The conditions under which the loop body executes 0 times are computed.
   Since the initializing condition is I==low+1; and the loop execution condition is I<high, the loop executes for 0 iterations when low+1>=high.
3. Since our resulting loop body is empty, no optimizations need to be done on it.
4. Propagating these conditions to the post-loop code:
   The statement SWAP(A[low], A[lastsmall]) would be eliminated, because the value of low equals lastsmall. Simple copy-propagation using def-use analysis is suitable.
   Applying the technique for creating procedure clones using control flow analysis of the procedure body, both the recursive calls can be eliminated. This technique is disclosed in commonly assigned U.S. patent application Ser. No. 09/704649 entitled "Procedure Cloning Using Control Flow Analysis Of The Procedure Body" and filed 2 Nov. 2000, the contents of which are hereby incorporated by reference. This technique enables procedures to be cloned based on the control-flow information of the procedure body. The procedure body is analyzed, and specialized versions of the procedure are created, and for each such version, the conditions on the parameters and global variables that would lead to this specialized version being executed are stored. Pairs of: <condition, specialized version>are stored as a list. At specific call-sites, this list is scanned to determine the strongest of these conditions which can be proved to hold at the call-site. If such a condition is obtained, the call to the original procedure is replaced by a call to this specialized version. A given specialized version can have a NULL body, in which case, the call can be avoided altogether, avoiding the procedure calls overhead altogether.

In this example, the procedure body executes only when (second_argument<third_argument). If we can prove the condition (second_argument>=third_argument) holds at the call-site, the called procedure wouldn't execute any code. Thus such a call can be eliminated altogether.

In the newly generated code, the two recursive calls are quicksort(A, low, lastsmall) and quicksort(A, lastsmall+1, high). Since lastsmall==low, the calls become quicksort(A, low, low) and quicksort(A, low+1, high). In both the cases, the condition (second argument>=third_argument) is satisfied, and thus, both these recursive calls are eliminated.

5. Propagating these conditions to the pre-loop code:
the statement p=A [low] is eliminated, because p is not used anywhere else; similarly, the statement lastsmall=low is eliminated.

Accordingly, everything preceding the loop body is eliminated.

6. A new code body is formed:

```
if (low+1==high)
{
    /*nothing performed here*/
}
```

7. At this stage, the cost-benefit analysis can be performed on the newly generated loop body. Since, in this case, the generated loop body is empty, the cost associated with the new loop body is zero, which of course represents a significant improvement over the original loop body. Accordingly this optimization is retained.

7. In view of the above, the original code would be modified to:

```
void quicksort(int A[ ], int low, int high)
{
    if (low<high)
    {
        if(low+1==high)
        {
        }
        else
        {
            int I,p,lastsmall;
            p=A[low];
            lastsmall=low;
            for(I=low+1; I<high; I++)
            {
                if (A[I] < p)
                {
                    lastsmall++;
                    SWAP(A[I],
                    A[lastsmall]);
                }
            }
        }
        SWAP(A[low], A[lastsmall];
```

```
        quicksort(A, low,lastsmall);
        quicksort(A, lastsmall+1, high);
    }
}
```

It is now shown how applying the second iteration of the algorithm would proceed. For the second iteration, the variable Current_Iterator would be set to (I=low+2).

1. In this iteration, the loop body is unrolled once. Doing this yields the following code body:

```
{
    if (A[i] < p)
    {
        lastsmall++;
        SWAP(A[I], A[lastsmall]);
    }
}
```

2. The conditions under which the loop body in the procedure quicksort will be executed once are derived. Since the value Current_Iterator shows the value of "I" as low+2, and the loop terminates at I>=high; the execution condition is obtained as (low+2>=high).

3. Optimizing this new loop body would involve propagating the values of "I" and lastsmall. Since from the initial conditions we have I==low+1 and lastsmall==low, propagating these values gives the new loop body as:

```
{
    if (A[low + 1] < A[low])
    {
        SWAP(A[low + 1], A[low + 1]);
    }
}
```

The SWAP statement is optimized out, and; hence the new body becomes:

```
{
    if (A[low + 1] < A[low])
    {
    }
}
```

Since the conditional expression has an empty body, even this expression is also eliminated.

4. The details of the optimization of the post-loop code are now described. In the loop, when the conditional A[low+1]<A[low] is true, then at the end of the loop, the value of the lastsmall is low+1. Therefore, the post loop code becomes:

SWAP(A[low],A[low+1])

quicksort(A, low,low+1)

quicksort(A, low+2,high)

Even here, the technique on cloning procedures using the control flow graph can be applied. Analyzing the procedure body obtained after applying this algorithm for one iteration, the procedure quicksort does not perform any task unless the condition second_argument+1<third_argument is satisfied. Therefore no work is done if the condition second_argument+1>=third_argument is true. This condition does hold in the above case; therefore, the two recursive calls can be eliminated, and the resultant code becomes:

SWAP(A[low],A[low+1])

When that conditional is not taken, then the value of lastsmall equals 'low'. In that case, the post loop code becomes:

SWAP(A[low],A[low])

quicksort(A,low,low+1)

quicksort(A,low+1,high)

Thus, the SWAP statement is eliminated, since the two locations being swapped are the same. Applying the same technique as explained in the previous paragraph, the two recursive calls are eliminated as well. Therefore, everything in the post-loop code gets eliminated.

5. Propagating these conditions to the pre-loop code:
p=A[low] is eliminated, because is not used anywhere else.
Similarly, lastsmall=low also gets eliminated.
Thus, everything preceding the loop body is eliminated.
6. The new loop body generated is:

```
if (A[low + 1] < A[low])
{
    SWAP(A[low],A[low+1])
}
```

7. Here we shall illustrate how the cost-benefit analysis could proceed. In the newly generated loop body, we have one conditional statement, and the macro for swapping statements, which translates to 3 assignment statements (since we have defined SWAP(x,y) as{temp=x; x=y; y=temp;}

Assuming that for a given architecture, the cost associated with a conditional statement C is C(C), the probability of this conditional being true is P(C) and the cost associated with an assignment statement A be C(A).

Thus, the cost associated with the newly generated code would be: C(C)+P(A)*(3*C(A)).

Applying a similar procedure, the cost associated with the original code body is computed (assigning a cost to each kind of operation, and summing over the cost of all the statements). The probability with which a given conditional is true is also taken into account. If there is no way to compute this probability, the worst case value as 1 is assumed).

It is clear that the newly generated code is much shorter compared to the original code body. Therefore, in this case, too, the optimization is retained.

8. The original code is thus modified to:

```
void quicksort(int A[ ], int low, int high)
{
    if (low + 1 < high)
    {
        if(low+2>=high)
        {
            if (A[low] > A[low + 1]
```

```
                SWAP(A[low], A[low + 1]);
        }
        else
        {
            int I,p,lastsmall;
            p=A[low];
            lastsmall=low;
            for(I=low+1; I<high; I++)
            {
                if (p < A[i])
                {
                    lastsmall++;
                    SWAP(A[I], A[lastsmall]);
                }
            }
            SWAP(A[low], A(lastsmall];
            quicksort(A, low,lastsmall);
            quicksort(A, lastsmall+1, high);
        }
}
```

Multiple and Nested Loops

In order to handle multiple loops, a loop tree is constructed. For this tree, the nodes represent the loops in a given procedure body; loop L is a child of loop L' if and only if loop L is immediately nested within loop L'. This would create a hierarchy of loop levels. The root of the tree represents the entire procedure body.

For the purpose of this analysis, this tree is traversed using a postorder-style traversal (that is, traversing all the children before traversing the parent).

For any given loop node L (at say, loop level 'I'),

All the children ($L_1, L_2, \ldots L_n$) of L are first unrolled and optimized.

Forward and backward propagation of optimization conditions is then performed, optimizing only the portion of the code that is a part of the loop node L to obtain new, optimized versions of the code. The optimization is otherwise similar to the single-loop case.

This procedure may require many iterations before a fixed point is reached. However, the optimizer may choose to reach the fixed point or just stop at whatever has been obtained after a pre-determined number of iterations have been performed.

The algorithms can be preferably implemented at the intermediate code level, when the other data structures required for traditional optimization (namely, control flow graph, data flow graph, etc.) are available.

Computer hardware

Figure 3:
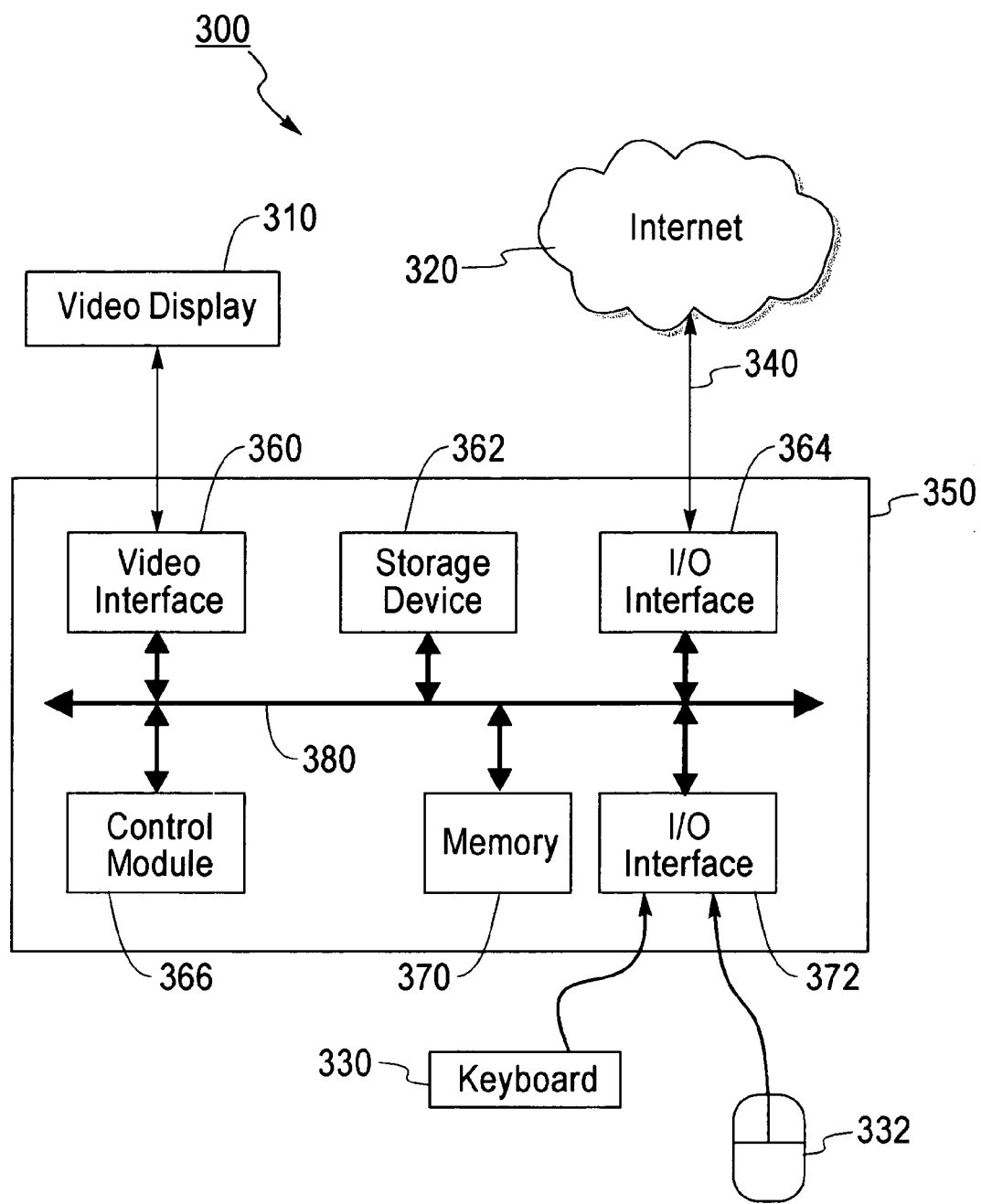
FIG. 3 is a schematic drawing representing computer hardware suitable for executing a compiler implementing the method steps of FIG. 2.

The above described process is implemented in a compiler executed on a computer system 300 as shown in FIG. 3. In particular, the compiler can be implemented as a software program, or computer readable program code, executing on the computer system 300.

The computer system 300 includes a computer 350, a video display 310, and input devices 330, 332. In addition, the computer system 300 can have any of a number of other output devices including line printers, laser printers, plotters, and other reproduction devices connected to the computer 350. The computer system 300 can be connected to one or more other computers via a communication input/output (I/O) interface 364 using an appropriate communication channel 340 such as a modem communications path, an electronic network, or the like. The network may include a local area network (LAN), a wide area network (WAN), an Intranet, and/or the Internet 320.

The computer 350 includes the control module 366, a memory 370 that may include random access memory (RAM) and read-only memory (ROM), input/output (I/O) interfaces 364, 372, a video interface 360, and one or more storage devices generally represented by the storage device 362. The control module 1066 is implemented using a central processing unit (CPU) that executes or runs a computer readable program code that performs a particular function or related set of functions.

The video interface 360 is connected to the video display 310 and provides video signals from the computer 350 for display on the video display 310. User input to operate the computer 350 can be provided by one or more of the input devices 330, 332 via the I/O interface 372. For example, a user of the computer 350 can use a keyboard as I/O interface 330 and/or a pointing device such as a mouse as I/O interface 1032. The keyboard and the mouse provide input to the computer 350. The storage device 362 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 350 is typically connected to other devices via a bus 380 that in turn can consist of data, address, and control buses.

The method steps for are effected by instructions in the software that are carried out by the computer system 300. Again, the software may be implemented as one or more modules for implementing the method steps.

In particular, the software may be stored in a computer readable medium, including the storage device 362 or that is downloaded from a remote location via the interface 364 and communications channel 340 from the Internet 320 or another network location or site. The computer system 300 includes the computer readable medium having such software or program code recorded such that instructions of the software or the program code can be carried out.

The computer system 300 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 366. Intermediate storage of the program code and any data including entities, tickets, and the like may be accomplished using the memory 370, possibly in concert with the storage device 362.

In some instances, the program may be supplied to the user encoded on a CD-ROM or a floppy disk (both generally depicted by the storage device 362), or alternatively could be read by the user from the network via a modem device connected to the computer 350. Still further, the computer system 300 can load the software from other computer readable media. This may include magnetic tape, a ROM or integrated circuit, a magneto-optical disk, a radio or infrared transmission channel between the computer and another device, a computer readable card such as a PCMCIA card, and the Internet 320 and Intranets including email transmissions and information recorded on Internet sites and the like. The foregoing are merely examples of relevant computer readable media. Other computer readable media may be practised without departing from the scope and spirit of the invention.

Further to the above, the described methods can be realised in a centralised fashion in one computer system 300, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: (a) conversion to another language, code or notation or (b) reproduction in a different material form.

It is understood that the invention is not limited to the embodiment described, but that various alterations and modifications, as would be apparent to one skilled in the art, are included within the scope of the invention.

I claim:

1. A method of optimizing compiled code generated from a high level computer programming languages, wherein the compiled code includes loop constructs, the method comprising the steps:
   (a) storing a predetermined number a for a compiler;
   (b) providing a non-optimized loop code segment corresponding to a loop construct written in a high level programming language, wherein in the non-optimized loop code segment the loop construct may be executed at run time at least a loop repetition number of times n, depending upon a value at run time of a variable in a loop termination condition of the loop code segment, and the non-optimized loop code segment includes a call to a procedure;
   (c) providing a non-optimized pre-loop code segment corresponding to programming instructions preceding the loop construct, and a non-optimized post-loop code segment corresponding to instructions succeeding the loop construct;
   (d) performing a computation by the compiler for determining n+1 values for the variable in the loop termination condition, such that a first one of the values would, upon execution at run time, terminate the loop code segment in 0 iterations, a second one of the values would, upon execution at run time, terminate the loop code segment in 1 iteration, and an (n+1)th one of the values would, upon execution at run time, terminate the loop code segment in n iterations, wherein the call invokes the procedure responsive to arguments of the call, the arguments including ones of the program variables;
   (e) optimizing the non-optimized pre-loop, loop and post-loop code segments, wherein the optimizing includes the compiler;
   propagating the values to the loop code segment, the pre-loop code and the post-loop code;
   detecting effects on the loop code segment, the pre-loop code and the post-loop code of propagating the values, including detecting redundancies and invariant expressions in the loop code segment, the pre-loop code and the post-loop code resulting from the propagation of the values, so that the compiler may eliminate, or at least simplify, some of the loop code segment, pre-loop code and post-loop code to provide a consolidated code segment corresponding with conditions for execution of the loop said loop repetition number of times n, wherein the consolidated code includes certain code of the non-optimized loop code segment, the non-optimized pre-loop code and the non-optimized post-loop code and omits certain other code of the non-optimized loop code segment, the non-optimized pre-loop code and the non-optimized post-loop code and wherein the call is omitted from the consolidated loop code segment if the certain program variable values are such that the call invoking the procedure results in no change in program variables;

(f) determining whether the consolidated code segment should be executed in preference to the non-optimized code segments; and (g) if said determination is favourable, including the consolidated code segment in optimized code for a program written in the high level programming language.

2. The method as claimed in claim 1, wherein said step (f) involves a cost-benefit analysis to determined whether the cost of using the consolidated code segment is reduced by a predetermined threshold compared with not using the consolidated code segment.

3. The method as claimed in claim 1, wherein the inclusion of said consolidated code segment in the optimized code is conditional on the occurrence of the execution conditions.

4. The method as claimed in claim 1, wherein said loop constructs include any one or more of the following loop constructs: for loops, while loops, repeat loops.

5. A compiler for optimizing the compiled code generated from high level computer programming languages wherein the compiled code includes loop constructs, the compiler being embodied on a computer-readable storage medium, the compiler comprising:

compiler code means for storing a predetermined number n for a compiler;

compiler code means for providing a non-optimized loop code segment corresponding to a loop construct written in a high level programming language, wherein in the non-optimized loop code segment the loop construct may be executed at run time at least a loop repetition number of times n, depending upon a value at run time of a variable in a loop termination condition of the loop code segment, and the non-optimized loop code segment includes a call to a procedure;

compiler code means for providing a non-optimized pre-loop code segment corresponding with programming instructions preceding the loop construct, and a non-optimized post-loop code segment corresponding with instructions succeeding the loop construct;

compiler code means for performing a computation by the compiler for determining n+1 values for the variable in the loop termination condition, such that a first one of the values would, upon execution at run time, terminate the loop code segment in 0 iterations, a second one of the values would, upon execution at run time, terminate the loop code segment in 1 iteration, and an (n+1)th one of the values would, upon execution at run time, terminate the loop code segment in n iterations, wherein the call invokes the procedure responsive to arguments of the call, the arguments including ones of the program variables;

compiler code means for optimizing the non-optimized pre-loop, loop and post-loop code segments, wherein the optimizing includes the compiler propagating the values to the loop code segment, the pre-loop code and the post-loop code;

detecting effects on the loop code segment, the pre-loop code and the post-loop code of propagating the values, including detecting redundancies and invariant expressions in the loop code segment the pre-loop code and the post-loop code resulting from the propagation of the values, so that the compiler may eliminate, or at least simplify, some of the loop code segment, pre-loop code and post-loop code to provide a consolidated code segment corresponding with conditions for execution of the loop said loop repetition number of times n, wherein the consolidated code includes certain code of the non-optimized loop code segment, the non-optimized pre-loop code and the non-optimized post-loop code and omits certain other code of the non-optimized loop code segment, the non-optimized pre-loop code and the non-optimized post-loop code and wherein the call is omitted from the consolidated loop code segment if the certain program variable values are such that the call invoking the procedure results in no change in program variables;

compiler code means for determining whether the consolidated code segment should be executed in preference to the non-optimized code segments; and compiler code means for including the consolidated code segment in optimized code for a program written in the high level programming language, if said determination is favourable.

6. The compiler as claimed in claim 5, wherein said determining whether the consolidated code segment should be executed in preference to the non-optimized code segments includes determining by cost-benefit analysis whether the cost of using the consolidated code segment is reduced by a predetermined threshold compared with not using the consolidated code segment.

7. The compiler as claimed in claim 5, wherein the inclusion of said consolidated code segment in the optimized code is conditional on the occurrence of the execution conditions.

8. The compiler as claimed in claim 5, wherein said loop constructs includes any one or more of the following loop constructs: for loops, while loops, repeat loops.

* * * * *